US008126304B2

(12) United States Patent
Mullaney et al.

(10) Patent No.: US 8,126,304 B2
(45) Date of Patent: Feb. 28, 2012

(54) METHODS FOR TERMINATING OPTICAL FIBER CABLES

(75) Inventors: Julian Mullaney, Raleigh, NC (US); James A. Powell, Garner, NC (US); William Alan Carrico, Raleigh, NC (US); Christopher A. Hastings, Garner, NC (US); Craig Ray, Fuquay Varina, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 12/794,067

(22) Filed: Jun. 4, 2010

(65) Prior Publication Data

US 2010/0239215 A1     Sep. 23, 2010

Related U.S. Application Data

(63) Continuation of application No. 11/655,707, filed on Jan. 19, 2007, now Pat. No. 7,756,372.

(60) Provisional application No. 60/775,614, filed on Feb. 22, 2006.

(51) Int. Cl.
*G02B 6/44* (2006.01)

(52) U.S. Cl. ........................ 385/100; 385/137

(58) Field of Classification Search .......... 385/100–114, 385/137
See application file for complete search history.

(56) References Cited

U.S. PATENT DOCUMENTS

| 4,152,539 A | 5/1979 | Charlebois et al. | ......... 174/72 R |
| 4,818,824 A | 4/1989 | Dixit et al. | ........................ 174/92 |
| 5,121,458 A * | 6/1992 | Nilsson et al. | ................. 385/100 |

(Continued)

FOREIGN PATENT DOCUMENTS

DE         3841427 A1 *  6/1990

OTHER PUBLICATIONS

Corning Cable Systems LLC, "OptiSheath™ Advantage Sealed Terminal (UCA4-xx & UCA5-xx)", Published Feb. 2006.

*Primary Examiner* — Charlie Peng
*Assistant Examiner* — Peter Radkowski
(74) *Attorney, Agent, or Firm* — Myers Bigel Sibley & Sajovec

(57) ABSTRACT

A fiber optic cable system includes a fiber optic main cable having a strength member and a plurality of optical fibers extending therein within an outer cable sheath. A flexible longitudinally extending inner housing is positioned proximate the plurality of optical fibers on a section of the main cable having the outer cable sheath removed. At least one fiber optic drop cable has at least one optical fiber having an end portion extending outwardly from an end of the drop cable. The end portion is spliced together with an end portion of a corresponding at least one severed end portion of one of the plurality of optical fibers of the main cable to define at least one spliced together fiber portion coupling at least one of the plurality of optical fibers of the main cable to a corresponding one of the at least one fiber of the drop cable. A longitudinally extending outer protective housing extends over the section of the main cable having the outer cable sheath removed and the inner housing and the strength member. The outer protective housing has a first opening receiving the main cable and a second opening, longitudinally displaced from the first opening, receiving the main cable and at least one of the openings receiving the drop cable or cables.

5 Claims, 14 Drawing Sheets

U.S. PATENT DOCUMENTS

| | | | | |
|---|---|---|---|---|
| 5,217,808 A | 6/1993 | Cobb | | 428/392 |
| 5,241,611 A | 8/1993 | Gould | | 385/70 |
| 5,335,408 A | 8/1994 | Cobb | | 29/447 |
| 5,440,665 A | 8/1995 | Ray et al. | | 385/135 |
| 5,449,299 A | 9/1995 | Shimirak et al. | | 439/417 |
| 5,479,553 A | 12/1995 | Daems et al. | | 385/135 |
| 5,528,718 A * | 6/1996 | Ray et al. | | 385/136 |
| 5,657,413 A | 8/1997 | Ray et al. | | 385/139 |
| 5,696,864 A | 12/1997 | Smith et al. | | 385/135 |
| 6,137,934 A * | 10/2000 | Consonni | | 385/109 |
| 6,215,930 B1 | 4/2001 | Estes et al. | | 385/100 |
| 6,579,014 B2 | 6/2003 | Melton et al. | | 385/78 |
| 6,648,520 B2 | 11/2003 | McDonald et al. | | 385/78 |
| 6,928,217 B2 | 8/2005 | Mohler et al. | | 385/113 |
| 7,006,739 B2 | 2/2006 | Elkins et al. | | 385/100 |
| 7,016,592 B2 | 3/2006 | Elkins et al. | | 385/136 |
| 7,088,893 B2 * | 8/2006 | Cooke et al. | | 385/100 |
| 7,090,407 B2 | 8/2006 | Melton et al. | | 385/62 |
| 7,127,143 B2 | 10/2006 | Elkins et al. | | 385/100 |
| 7,136,555 B2 | 11/2006 | Theuerkorn et al. | | 385/100 |
| 7,228,036 B2 | 6/2007 | Elkins et al. | | 385/100 |
| 7,251,411 B1 | 7/2007 | Lu et al. | | 385/147 |
| 7,266,274 B2 | 9/2007 | Elkins et al. | | 385/100 |
| 7,277,614 B2 | 10/2007 | Cody et al. | | 385/100 |
| 7,289,714 B1 | 10/2007 | Wells | | 385/135 |
| 7,756,372 B2 * | 7/2010 | Mullaney et al. | | 385/100 |
| 2001/0036342 A1 | 11/2001 | Knecht et al. | | 385/84 |
| 2002/0057870 A1 | 5/2002 | Dean, Jr. et al. | | 385/28 |
| 2002/0064364 A1 * | 5/2002 | Battey et al. | | 385/136 |
| 2003/0063866 A1 | 4/2003 | Melton et al. | | 385/76 |
| 2003/0081910 A1 | 5/2003 | Gimbel et al. | | 385/80 |
| 2003/0103750 A1 | 6/2003 | Laporte et al. | | 385/134 |
| 2003/0123812 A1 | 7/2003 | Beatty et al. | | 385/72 |
| 2003/0210871 A1 | 11/2003 | Rosson et al. | | 385/78 |
| 2003/0235374 A1 | 12/2003 | Luther et al. | | 385/85 |
| 2004/0047566 A1 | 3/2004 | McDonald et al. | | 385/78 |
| 2004/0047567 A1 | 3/2004 | Gimbel et al. | | 385/80 |
| 2004/0101255 A1 | 5/2004 | Dean, Jr. et al. | | 385/85 |
| 2004/0114874 A1 | 6/2004 | Bono et al. | | 385/53 |
| 2004/0120656 A1 | 6/2004 | Banas et al. | | 385/86 |
| 2004/0123998 A1 | 7/2004 | Berglund et al. | | 174/92 |
| 2004/0126069 A1 | 7/2004 | Jong et al. | | 385/189 |
| 2004/0152354 A1 | 8/2004 | Luther et al. | | 439/378 |
| 2004/0234215 A1 * | 11/2004 | Serrano et al. | | 385/100 |
| 2004/0252960 A1 | 12/2004 | Battey et al. | | 385/135 |
| 2005/0013565 A1 | 1/2005 | Mohler et al. | | 385/113 |
| 2005/0031285 A1 | 2/2005 | Barnes et al. | | 385/134 |
| 2005/0036742 A1 | 2/2005 | Dean, Jr. et al. | | 385/71 |
| 2005/0041926 A1 | 2/2005 | Elkins et al. | | 385/53 |
| 2005/0069264 A1 | 3/2005 | Luther et al. | | 385/59 |
| 2005/0105873 A1 | 5/2005 | Reagan et al. | | 385/135 |
| 2005/0111799 A1 | 5/2005 | Cooke et al. | | 385/100 |
| 2005/0111800 A1 * | 5/2005 | Cooke et al. | | 385/100 |
| 2005/0129375 A1 | 6/2005 | Elkins et al. | | 385/100 |
| 2005/0129379 A1 | 6/2005 | Reagan et al. | | 385/135 |
| 2005/0145522 A1 | 7/2005 | Bloodworth et al. | | 206/409 |
| 2005/0163448 A1 | 7/2005 | Blackwell, Jr. | | 385/135 |
| 2005/0175307 A1 | 8/2005 | Battey et al. | | 385/135 |
| 2005/0175308 A1 | 8/2005 | Elkins, II et al. | | 385/135 |
| 2005/0180705 A1 * | 8/2005 | Elkins et al. | | 385/100 |
| 2005/0185895 A1 | 8/2005 | Keenum et al. | | 385/76 |
| 2005/0185910 A1 | 8/2005 | Zimmel | | 385/135 |
| 2005/0207711 A1 | 9/2005 | Vo et al. | | 385/94 |
| 2005/0220421 A1 | 10/2005 | Keenum et al. | | 385/62 |
| 2005/0232567 A1 | 10/2005 | Reagan et al. | | 385/135 |
| 2005/0259928 A1 | 11/2005 | Elkins et al. | | 385/100 |
| 2005/0259929 A1 * | 11/2005 | Elkins et al. | | 385/100 |
| 2006/0056782 A1 | 3/2006 | Elkins et al. | | 385/100 |
| 2006/0193573 A1 | 8/2006 | Greenwood et al. | | 385/103 |
| 2006/0193574 A1 | 8/2006 | Greenwood et al. | | 385/103 |
| 2006/0193575 A1 | 8/2006 | Greenwood et al. | | 385/109 |
| 2006/0193594 A1 | 8/2006 | Greenwood et al. | | 385/147 |

* cited by examiner

METHODS FOR TERMINATING OPTICAL FIBER CABLES

RELATED APPLICATIONS

The present application is a continuation of U.S. patent application Ser. No. 11/655,707 filed on Jan. 19, 2007 now U.S. Pat. No. 7,756,372, which claims priority from U.S. Provisional Application No. 60/775,614, filed Feb. 22, 2006, the disclosures of which are hereby incorporated herein in their entirety by reference.

BACKGROUND OF THE INVENTION

The present invention relates to communication cable termination systems and, more particularly, to optical fiber termination systems and methods for terminating the same.

An extensive infrastructure supporting telecommunication has been developed, traditionally based upon copper wire connections between individual subscribers and telecommunications company network distribution points. More recently, much of the telecommunications network infrastructure is being extended or replaced with an optical fiber based communications network infrastructure. The carrying capacity and communication rate capabilities of such equipment may exceed that provided by conventional copper wired systems.

As such, fiber optic cables are widely used for telecommunications applications where high information capacity, noise immunity and other advantages of optical fibers may be exploited. Fiber cable architectures are emerging for connecting homes and/or business establishments, via optical fibers, to a central location, for example. A trunk or main cable may be routed, for example, through a housing subdivision and small fiber count "drop cables" may be spliced to the main cable at predetermined spaced apart locations.

A typical main cable may be installed underground and have multiple drop cables connected thereto, each of a hundred feet or more. Each of the drop cables, in turn, may be routed to an optical network unit (ONU) serving several homes. Information may then be transmitted optically to the ONU, and into the home, via conventional copper cable technology, although it also has been proposed to extend optical fiber all the way to the home rather than just to the ONU. Thus, the drop cables may serve groups of users, although other architectures may also employ a main cable and one or more drop cables connected thereto.

Unfortunately, the fibers within the main cable must typically be accessed at the various drop points and spliced to respective drop cables after the main cable has already been installed. Accessing the main cable for splicing generally requires careful preparation of the main cable including removing a portion of the cable sheath, and identifying and separating out predetermined fibers from within the cable without disturbing adjacent fibers. The separated fibers may then be spliced and secured within a conventional protective splice closure. Moreover, these cable access and splicing steps must typically be accomplished in the field by a technician who is likely to experience difficulties imposed by weather or the particular location of each of the drop points. Accordingly, field splicing of drop cables to a main cable is typically time consuming, expensive, and may produce low quality optical splices.

In an effort to overcome the disadvantages of field splicing drop cables at each of a series of drop points, so-called preterminated fiber optic cables have been proposed. A preterminated fiber optic cable includes a relatively high fiber count main cable to which respective low fiber count drop cables are spliced at predetermined drop points. The locations of the drop points may be determined based upon field survey measurements.

The splicing of the drop cables to the main cable of a preterminated cable is generally performed at the factory during manufacturing of the cable. The preterminated cable, including the main cable, drop cables, and associated splice closures, are desirably wound onto a cable reel and delivered to the installation site. Accordingly, conditions for making high quality splices may be maximized in the factory, thereby potentially increasing splice quality and also reducing the expense and difficulty associated with field splicing.

SUMMARY OF THE INVENTION

Embodiments of the present invention include fiber optic cable systems. Such systems include a fiber optic main cable having a strength member and a plurality of optical fibers extending therein within an outer cable sheath. A flexible longitudinally extending inner housing is positioned proximate the plurality of optical fibers on a section of the main cable having the outer cable sheath removed. The system further includes one or more fiber optic drop cable having at least one optical fiber having an end portion extending outwardly from an end of the drop cable. The end portion of the at least one optical fiber of said drop cable is spliced together with an end portion of a corresponding at least one severed end portion of one of the plurality of optical fibers of the main cable to define at least one spliced together fiber portion coupling at least one of the plurality of optical fibers of the main cable to a corresponding one of the at least one fiber of the drop cable. A longitudinally extending outer protective housing extends over the section of the main cable having the outer cable sheath removed and the inner housing and the strength member. The outer protective housing has a first opening receiving the main cable and a second opening, longitudinally displaced from the first opening, receiving the main cable. At least one of the first opening and the second opening receive the drop cable. The fiber optic cable system may be a factory preterminated optical fiber cable having a plurality of drop cables spliced to the main cable in inner housings positioned at a plurality of predetermined longitudinal positions on the cable.

In further embodiments, the inner housing is positioned around the plurality of optical fibers and between the plurality of optical fibers and the strength member and the plurality of optical fibers are positioned in a central core tube of the main cable longitudinally extending along a central axis of the main cable. A length of the central core tube may be removed in the section of the main cable having the outer cable sheath removed so that at least a portion of the at least one spliced together fiber portion is positioned at a position radially displaced from the central axis by a distance of no more than half an outer diameter of the central core tube. The at least one spliced together fiber portion may be located so that the at least one spliced together fiber portion is positioned in the inner housing at a position radially displaced from the central axis by a distance of no more that about half an outer diameter of the outer sheath.

In other embodiments, the plurality of optical fibers are positioned in a central core tube of the main cable longitudinally extending along a central axis of the main cable. A length of the central core tube is removed where the spliced together fiber portion is located so that the spliced together fiber portion is positioned in the inner housing at a position radially displaced from the central axis by a distance of no more that about half an outer diameter of the outer sheath. A flexible longitudinally extending inner liner may be positioned around the inner housing and between the inner housing and the strength member. The inner liner has a crush resistance in a radial direction relative to the central axis of the main cable greater than a crush resistance of the inner housing.

In further embodiments, the main cable includes a pair of strength members. The pair of strength members is positioned proximate substantially opposing sides of the inner strength so that the fiber optic cable system is more resistant to bending about a first transverse axis extending between the pair of strength members than along a second transverse axis orthogonal to the first transverse axis. A plurality of protective housings may be positioned at predetermined positions along the main cable and the main cable, with the protective housings thereon, may be wound around a cable spool with the second transverse axis oriented to facilitate wrapping of the main cable around the spool. The inner liner may be a longitudinally slit polymeric flex conduit. A first cutout may be provided on each end of the flex conduit that receive and position a first of the pair of strength members extending therebetween and a second cutout may be provided on each end of the flex conduit positioned substantially 180° from the first cutout that receive and position a second of the pair of strength members extending therebetween.

In other embodiments, a greater longitudinal length of the outer sheath is removed than of the central core tube to expose a segment of the central core tube at each end of the section of the main cable having the outer cable sheath removed. A first attachment member couples a first end of the inner housing to one of the exposed segments of the central core tube and a second attachment member couples a second end of the inner housing to the other of the exposed segments of the central core tube and couples the drop cable to the main cable. An environmental sealant may be provided surrounding each of the exposed segments of the core tube and the environmental sealant and the attachment members may be positioned in the outer protective housing. The drop cable may further include a buffer tube extending outwardly from the end of the drop cable with the at least one optical fiber therein and the second attachment member may couple the buffer tube of the drop cable to the central core tube of the main cable. The first and second attachment members may be tie wraps and the environmental sealant may be hot melt adhesive. The outer protective housing may be heatshrink and the plurality of optical fibers of the main cable and the at least one optical fiber of the drop cable may be ribbon cables.

In further embodiments, the inner housing includes an inner wall positioned between the at least one optical fiber of the drop cable and the at least one spliced together fiber portion and uncut ones of the plurality of optical fibers of the main cable extending across the section of the main cable having the outer cable sheath removed. The inner wall has a connector member on a first longitudinally extending end thereof. A first wrap around outer wall extends from a second end of the central wall displaced from the connector member and has a mating connector member on a second end thereof coupled to the connector member to define a first chamber around the uncut ones of the plurality of optical fibers of the main cable. A second wrap around outer wall extends from the second end of the central wall and has a mating connector member on a second end thereof coupled to the connector member to define a second chamber around the at least one optical fiber of the drop cable and the at least one spliced together fiber portion. Tie-down extension members extend from at least one of the outer walls on longitudinally displaced ends of the inner housing and extend over the exposed segments of the central core tube. The tie-wraps couple the extension members to the respective exposed segments of the central core tube.

In yet further embodiments, a second fiber optic drop cable having at least one optical fiber having an end portion extending outwardly from an end of the second drop cable is provided. The end portion of the at least one optical fiber of the second drop cable is spliced together with an end portion of a corresponding at least one severed end portion of one of the plurality of optical fibers of the main cable within the inner housing to define at least one second spliced together fiber portion coupling at least one of the plurality of optical fibers of the main cable to a corresponding one of the at least one fiber of the second drop cable.

In further embodiments, the inner housing includes a longitudinally extending dividing wall positioned between uncut ones of the plurality of optical fibers and the at least one spliced together fiber portion. A flexible longitudinally extending inner liner may be positioned around the inner housing and between the plurality of optical fibers and the at least one spliced together fiber portion and the strength member. The inner liner may include positioning surfaces therein configured to receive the inner housing and may further include guide members extending laterally therefrom that are configured to receive and position the strength member extending longitudinally proximate an outer surface of the inner liner.

In yet other embodiments, the inner liner includes a longitudinally extending first and second segment. The first segment has a connecting member thereon and the second segment has a mating connecting member thereon configured to receive the connecting member of the first segment to couple the first segment and the second segment in a position extending around the inner housing, the plurality of optical fibers and the at least one spliced together fiber portion.

In other embodiments, kits for use in factory preterminating at least one optical fiber of a fiber optic drop cable to a corresponding one of a plurality of optical fibers extending within an outer cable sheath of a fiber optic main cable include a flexible longitudinally extending inner housing configured to be positioned around the plurality of optical fibers and between the plurality of optical fibers and a strength member of the main cable on a section of the main cable having the outer cable sheath removed and around at least one spliced together fiber portion coupling at least one of the plurality of optical fibers of the main cable to a corresponding one of the at least one fiber of the drop cable. The kit further includes a longitudinally extending outer protective housing configured to extend over the section of the main cable having the outer cable sheath removed and the inner housing and the strength member, the outer protective housing having a first opening configured to receive the main cable and a second opening, longitudinally displaced from the first opening, configured to receive the drop cable and the main cable. The kits may further include a flexible longitudinally extending inner liner configured to be positioned around the inner housing and between the inner housing and the strength member, wherein the inner liner has a crush resistance in a radial direction relative to a central axis of the main cable greater than a crush resistance of the inner housing.

In yet further embodiments, methods of factory terminating an optical fiber cable include determining a number of longitudinally offset predetermined termination points to be provided on the optical fiber cable, wherein the number is greater than one. A number of tubular outer protective housings are slid onto the optical fiber cable over a first end of the optical fiber cable, wherein the number of tubular outer protective housings is at least equal to the number of termination points. The outer cable sheath is removed from a section of the optical fiber cable corresponding to a first of the termination points to expose a portion of a fiber protection tube of the optical fiber cable. A length of the exposed fiber protection tube is removed to expose a plurality of optical fibers of the optical fiber cable. An exposed one of the plurality of optical fibers is severed. The severed optical fiber of the optical fiber cable is spliced to an optical fiber of another optical fiber cable to provide a splice. One of the tubular outer protective housings is slid over the section of the optical fiber cable having the outer cable sheath removed. The outer protective housing is secured to the optical fiber cable to provide an environmental closure around the inner housing with the optical fiber cable extending from respective longitudinally displaced ends of the outer protective housing and the another optical fiber cable extending from at least one of the ends of the outer protective housing.

In other embodiments, the methods of factory terminating an optical fiber cable further include positioning the splice in a location proximate the removed length of the exposed fiber protection tube. An inner housing is positioned around the exposed plurality of optical fibers of the optical fiber cable and the splice and between the plurality of optical fibers and the splice and an exposed strength member of the optical fiber cable. Longitudinally displaced ends of the positioned inner housing are secured to respective un-removed exposed portions of the fiber protection tube extending from the optical fiber cable adjacent the section of the optical fiber cable having the outer cable sheath removed. Operations are repeated at additional ones of the predetermined termination points to splice additional optical fiber drop cables to the optical fiber cable.

In other embodiments, sliding one of the tubular outer protective housings into place is preceded by positioning an inner liner around the inner housing and between the inner housing and the strength member. The outer protective housing may be heatshrink and securing the outer protective housing may include heating the heatshrink.

DETAILED DESCRIPTION OF EMBODIMENTS OF THE INVENTION

Figure 1:
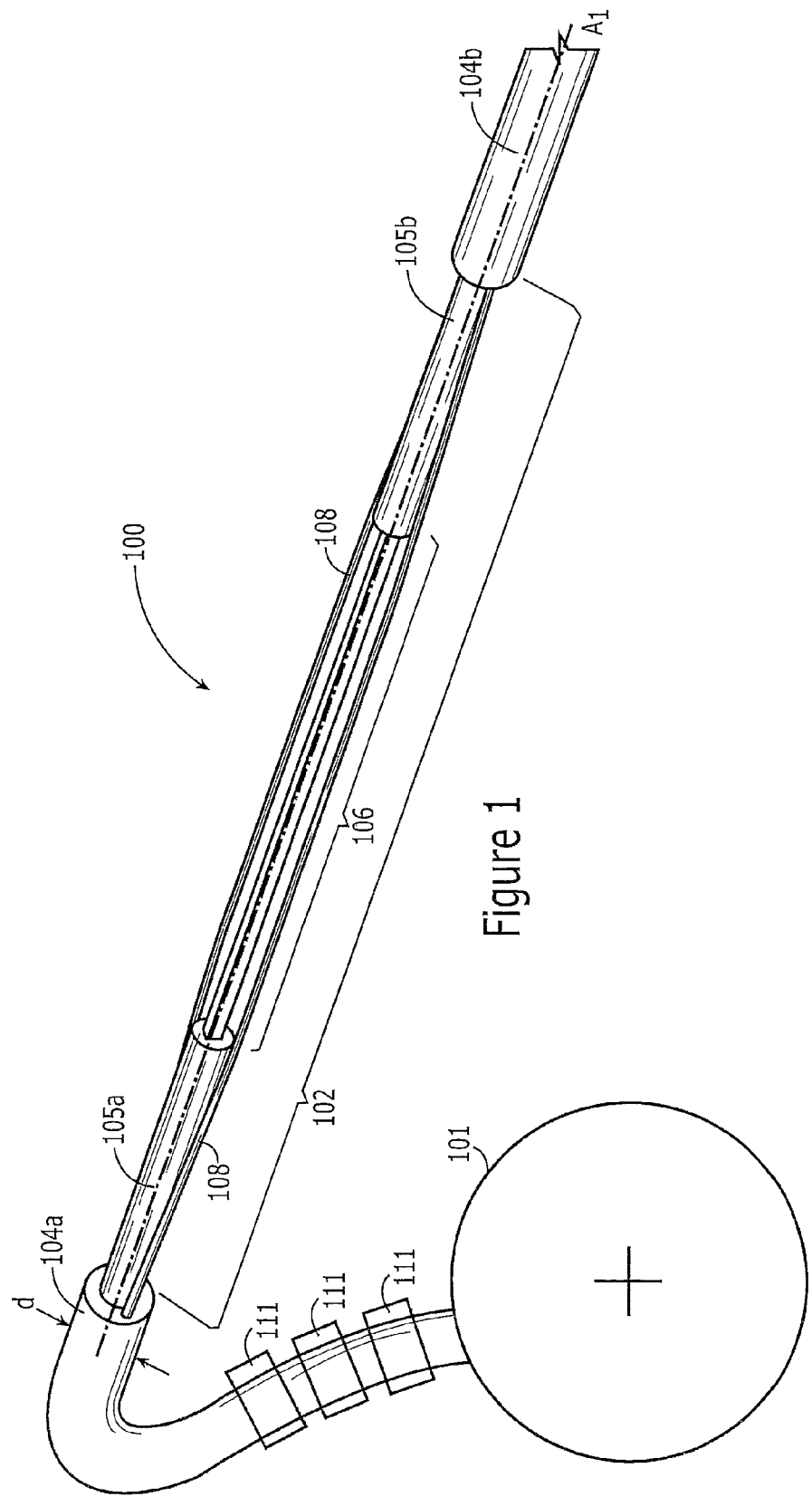
FIG. 1 is a perspective view illustrating an optical fiber cable to be preterminated according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present invention will now be further described with reference to FIGS. 1-6. A termination point of an optical fiber main cable 100 is shown in FIG. 1. The optical fiber main cable 100 is wound around and extends from a source spool 101. A plurality of protective housings, shown as tubular heatshrink sections 111 in FIG. 1, are positioned on the main cable 100 preparatory to factory terminating the optical fiber cable 100 according to some embodiments of the present invention.

Embodiments of the present invention may provide factory preterminated optical fiber cables that may be used, for example, in a factory installed termination system (FITS) and/or Verizon advanced termination system (VATS). Increased flexibility and tolerance to bending induced stress may be provided by some embodiments, which may allow not only for improved winding around spools, but installation benefits in applications requiring, for example, pulling of the cable through duct work or the like over extended distances. Furthermore, multiple drop cables may be provided exiting from each termination point closure. In addition, such systems may be used with both loose and ribbon cable fiber optic systems.

As shown in FIG. 1, the optical fiber cable 100 includes a plurality of optical fibers 110, shown as ribbon cable in FIG. 1, extending within a central core tube 105a, 105b, both of which longitudinally extend along a neutral (relative to bending) or central axis A1 of the cable 100. The central core tube 105a, 105b and two strength members 108 positioned on opposite sides of the central core tube 105a and 105b of the main cable 100 are surrounded by a protective outer cable sheath 104a, 104b of the main cable 100. The portion of the cable 100 shown in FIG. 1 corresponds to a termination point, where a slice may be made to form a factory preterminated fiber optic cable system where the cable 100 will be the main cable having drop cables spliced thereto at a plurality of longitudinally displaced termination points selected to be positioned at corresponding locations during installation in the field, such as in a neighborhood or the like.

While shown as including a central core tube 105a, 105b in FIG. 1, it will be understood that the present invention is not limited to embodiments where the main cable 100 is a central core tube type cable. For example, in some embodiments of the present invention, the main cable 100 may be a loose buffer tube type cable including a plurality of buffer tubes, wherein the buffer tubes act as fiber protection tubes in a manner substantially similar to the central core tube 105a, 105b but do not extend along a central axis of the cable. In other embodiments, a fiber protection tube may not be included in the main cable.

At the illustrated termination point, a section 102 of the main cable 100 has the outer cable sheath 104a, 104b removed. A length 106 of the central core tube 105a, 105b is removed in the section 102 to reveal the plurality of optical fibers 110. The strength members 108 are not cut, but extend continuously across the section 102 between the ends 104a and 104b of the cable 100 adjacent the section 102. The outer sheath 104a, 104b has a maximum diameter d.

As will be described further herein, the removal of the length 106 of the central core tube 105a, 105b is contrasted with conventional techniques of splicing, where an opening is cut in the central core tube 105a, 105b without removing the entire central core tube to allow access to the optical fibers 110. An improved splice may be provided as a result in some embodiments. More particularly, as will be discussed further herein, the removal of the length 106 of the central core tube 105a, 105b may allow a spliced-together fiber portion to be positioned at a position radially displaced from the central axis $A_1$ by a distance of no more than about half the outer diameter d of the outer sheath. Placement of the spliced portion so close to the central axis $A_1$ may increase operational flexibility of the preterminated fiber optic cable system by reducing stresses imposed on the splice during bending of the cable 100. It will be understood that the mechanical stress induced in the longitudinally extending members under flexing are greater the further from the neutral axis the splice is located. Furthermore, the close placement of the splice to the central axis $A_1$ may allow for a lower profile, thinner splice arrangement at the termination point, which may further facilitate rolling of the optical fiber cable 100 onto the spool 101.

Figure 2:
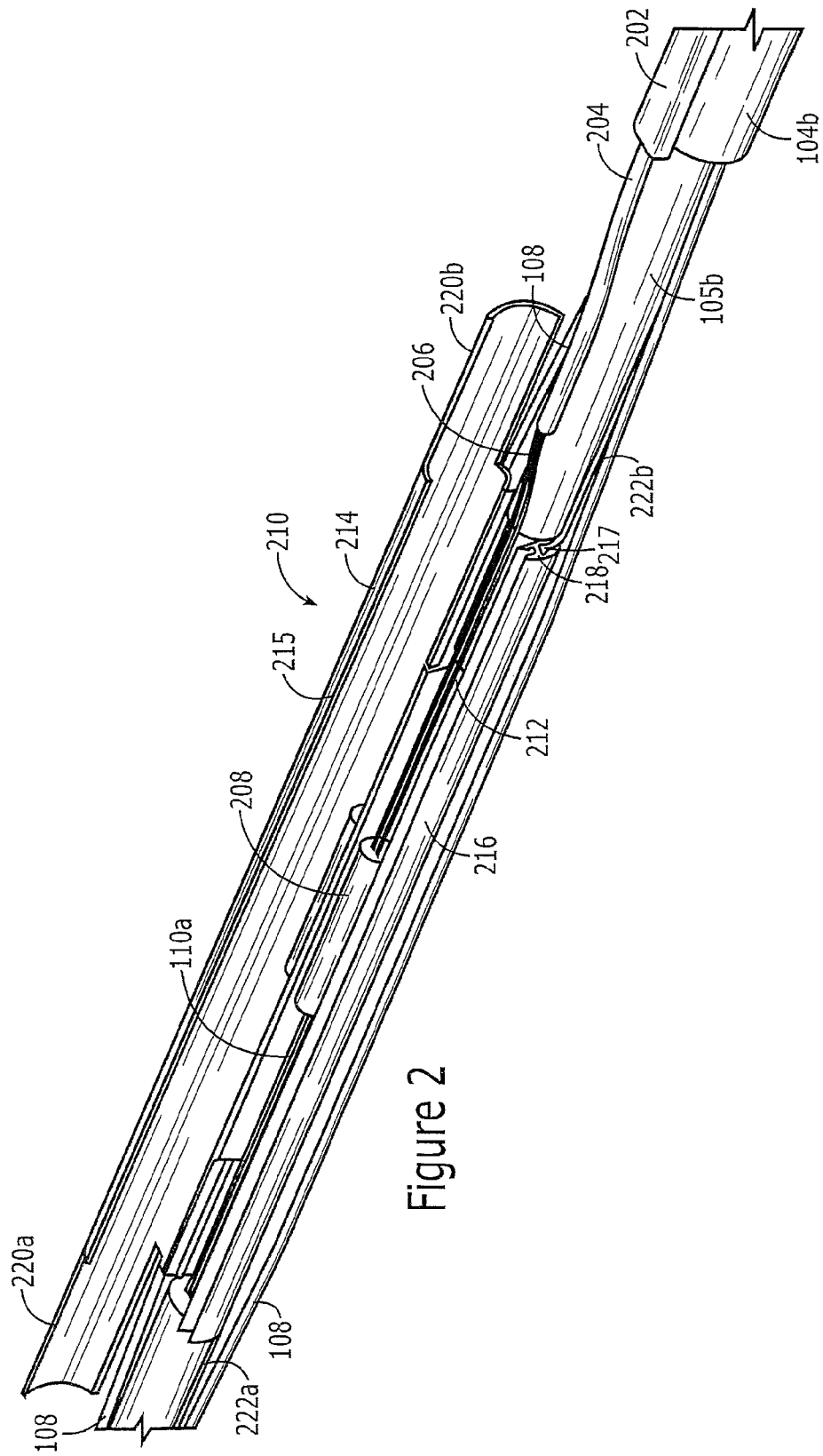
FIG. 2 is a perspective view of an inner housing of a fiber optic cable system according to some embodiments of the present invention on the optical fiber cable of FIG. 1.

Fiber optic cable systems according to some embodiments of the present invention will now be further described with references to FIGS. 2-6. As shown in FIG. 2, a flexible, longitudinally extending inner housing 210 is positioned around the plurality of optical fibers 110 and between the plurality of optical fibers 110 and the strength members 108 and between the plurality of optical fibers 110 and a spliced together fiber portion 208 on the section 102 of the main cable 100 having the outer sheathing 104a, 104b removed. The inner housing 210 may, for example, be a wrap-around housing or a multi-piece housing that may be positioned around the optical fiber cable 100.

A fiber optic drop cable 202 is shown that has a buffer tube 204 extending from an end therefrom and at least one optical fiber 206 having an end portion extending outwardly from the end of the drop cable 202 and buffer tube 204 and into the housing 210. The optical fiber(s) 206, like the plurality of optical fibers 110, may be ribbon cables. The optical fibers 206 are spliced to a severed end portion 110a of one of the plurality of optical fibers 110 of the main cable 100 within the housing 210 at the spliced-together fiber portion 208 coupling the main cable 100 and drop cable 202 fiber or fibers.

As best seen in FIGS. 2, 3A, 3B and 4B, the inner housing 210 in the illustrated embodiments includes a central or inner wall 212 positioned between the optical fiber 206 and the spliced-together fiber portions 208, 408a, 408b and uncut ones of a plurality of optical fibers 110 of the main cable 100 that extend across the exposed section 102 of the main cable 100. The inner wall 212 has a connector member 218 on a first longitudinally extending end thereof.

A first wrap-around outer wall 216 extends from an opposite end of the inner wall 212, displaced from the connector member 218, to define a first chamber around the uncut ones of the plurality of optical fibers 110 of the main cable 100. The first wrap-around outer wall 216 includes a mating connector member 217 on a second end thereof that may be coupled to the connector member 218. A second wrap-around outer wall 214 extends from the second end of the central wall 212 and has a mating connector member 215 on the second end thereof that may be coupled to the connector member 218 to define a second chamber around the optical fiber(s) 206 of the drop cable 202 and spliced-together fiber portions 208, 408a, 408b.

Figure 4A:
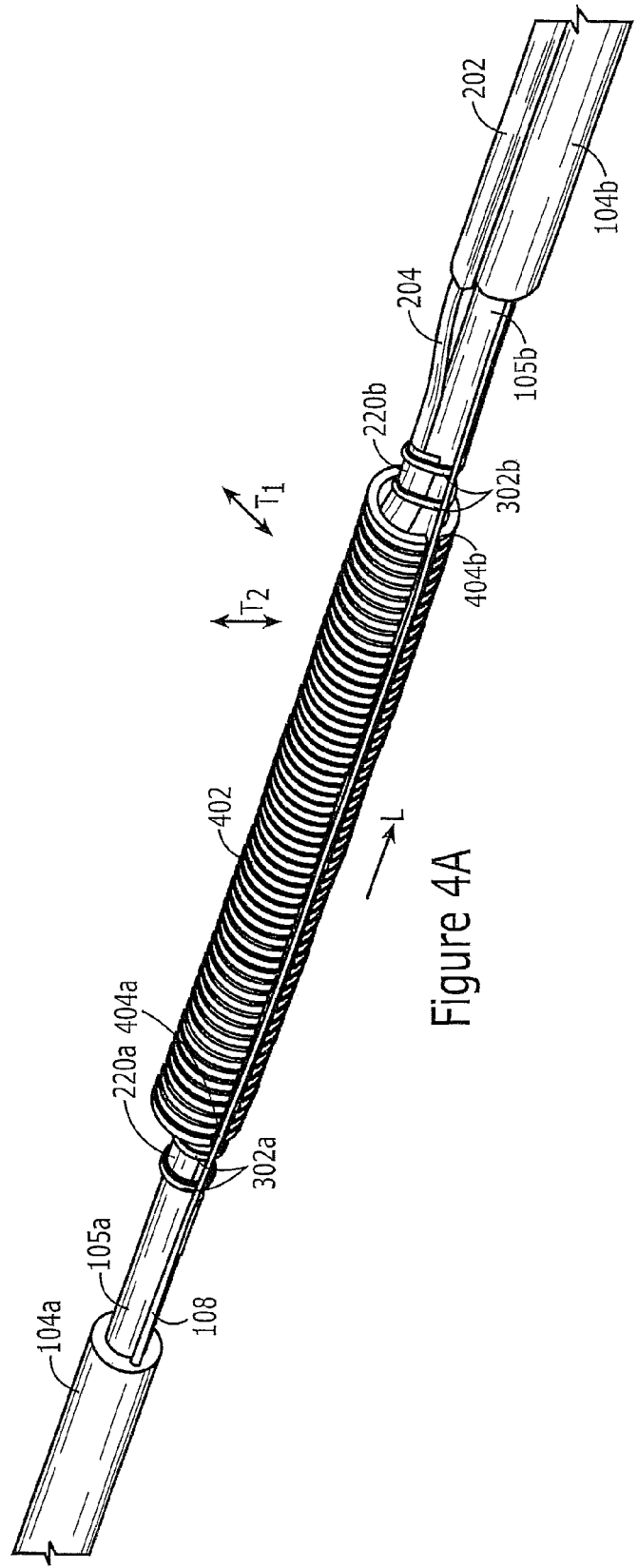
FIG. 4A is perspective view of an inner liner of a fiber optic cable system positioned over the inner housing of FIGS. 3A and 3B according to some embodiments of the present invention.
Figure 4B:
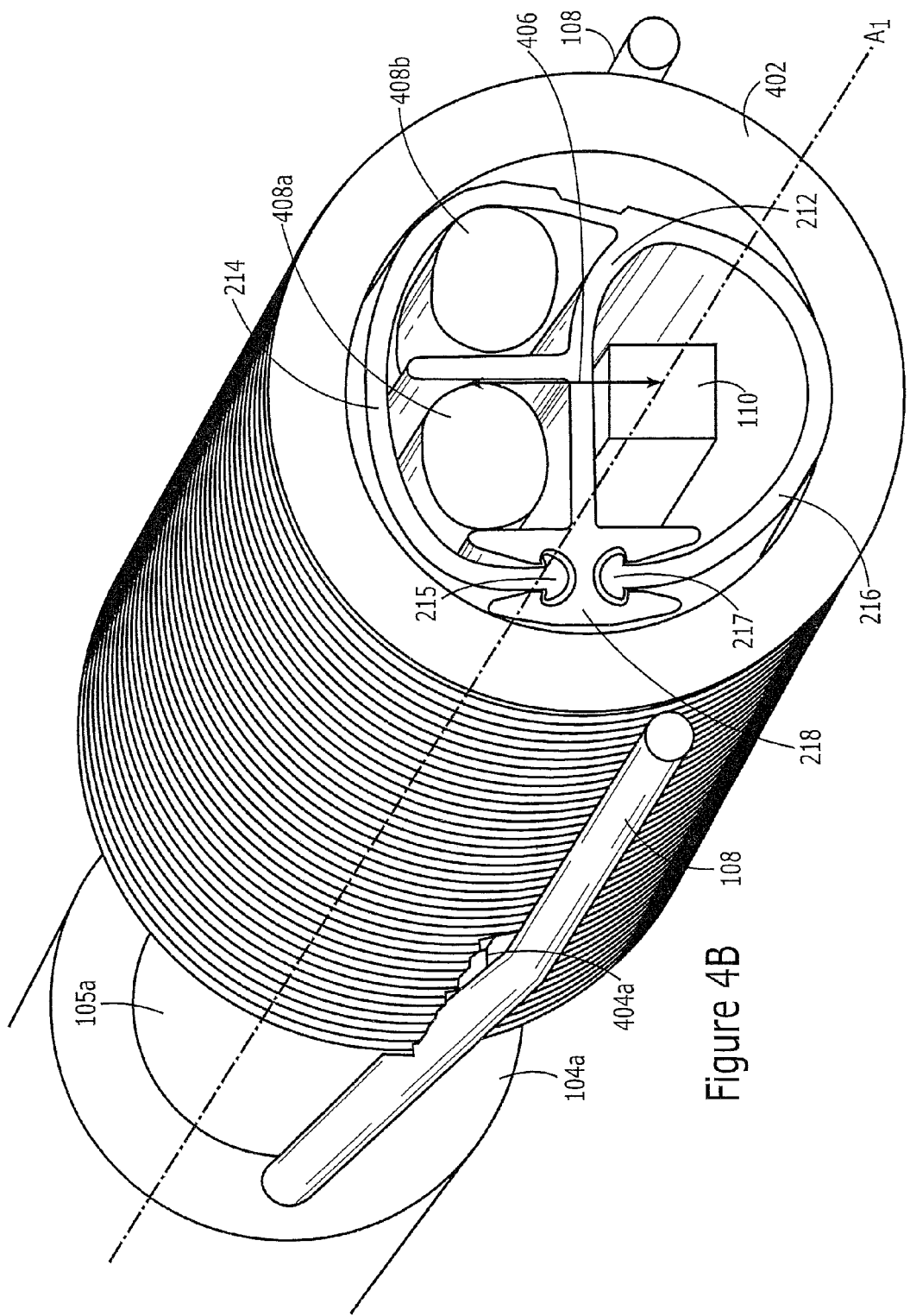
FIG. 4B is a cross sectioned perspective view of the arrangement of shown in FIG. 4A.

As illustrated in FIG. 4B some embodiments include a plurality of spliced-together fiber portions 408a, 408b that are provided with a dividing wall extending transversely from a median portion of the inner wall 212 therebetween so as to provide separate chambers for each of the spliced-together fiber portions 408a, 408b. The separate spliced-together fiber portions 408a, 408b may be used to splice two separate drop cables 202 to the main cable 100 in the inner housing 210 or to provide separate splicing of different optical fibers from a single drop cable 202 or the like.

Figure 3A:
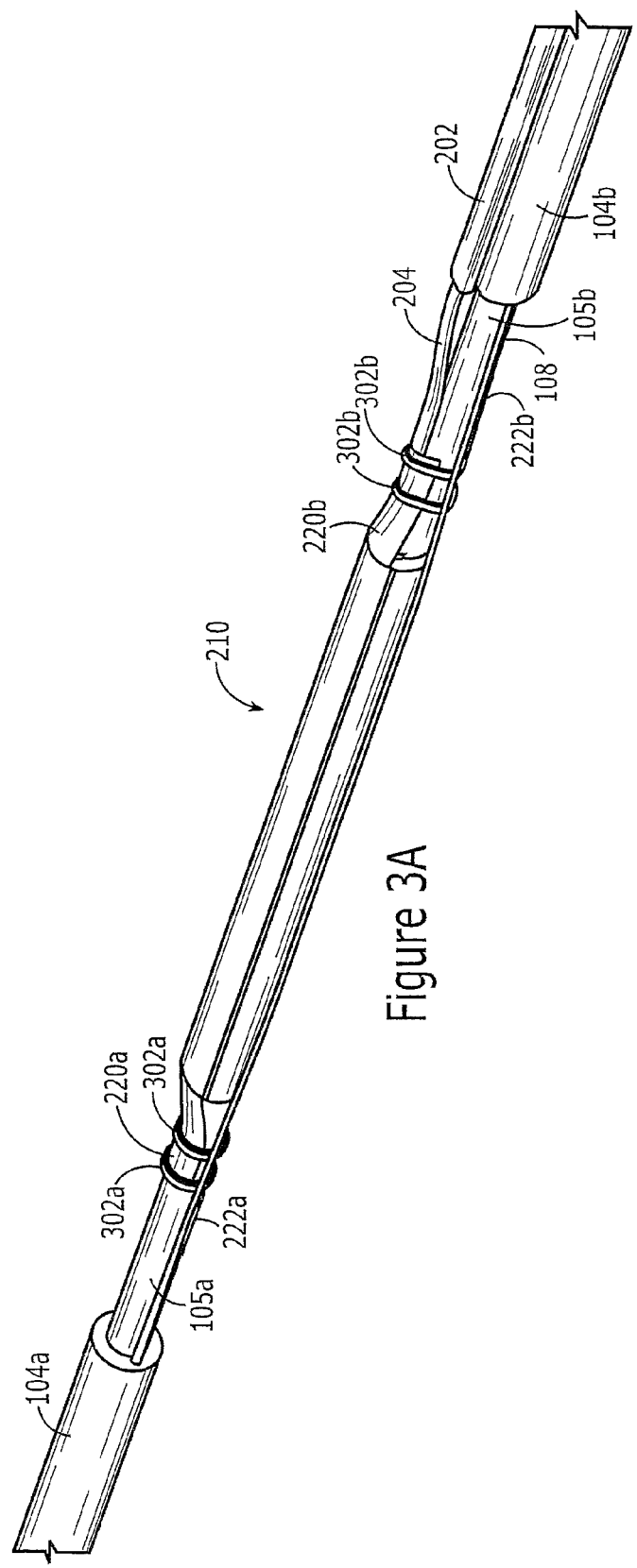
FIG. 3A is a perspective view of the inner housing of FIG. 2 secured to the optical fiber cable of FIG. 1 according to some embodiments of the present invention.
Figure 3B:
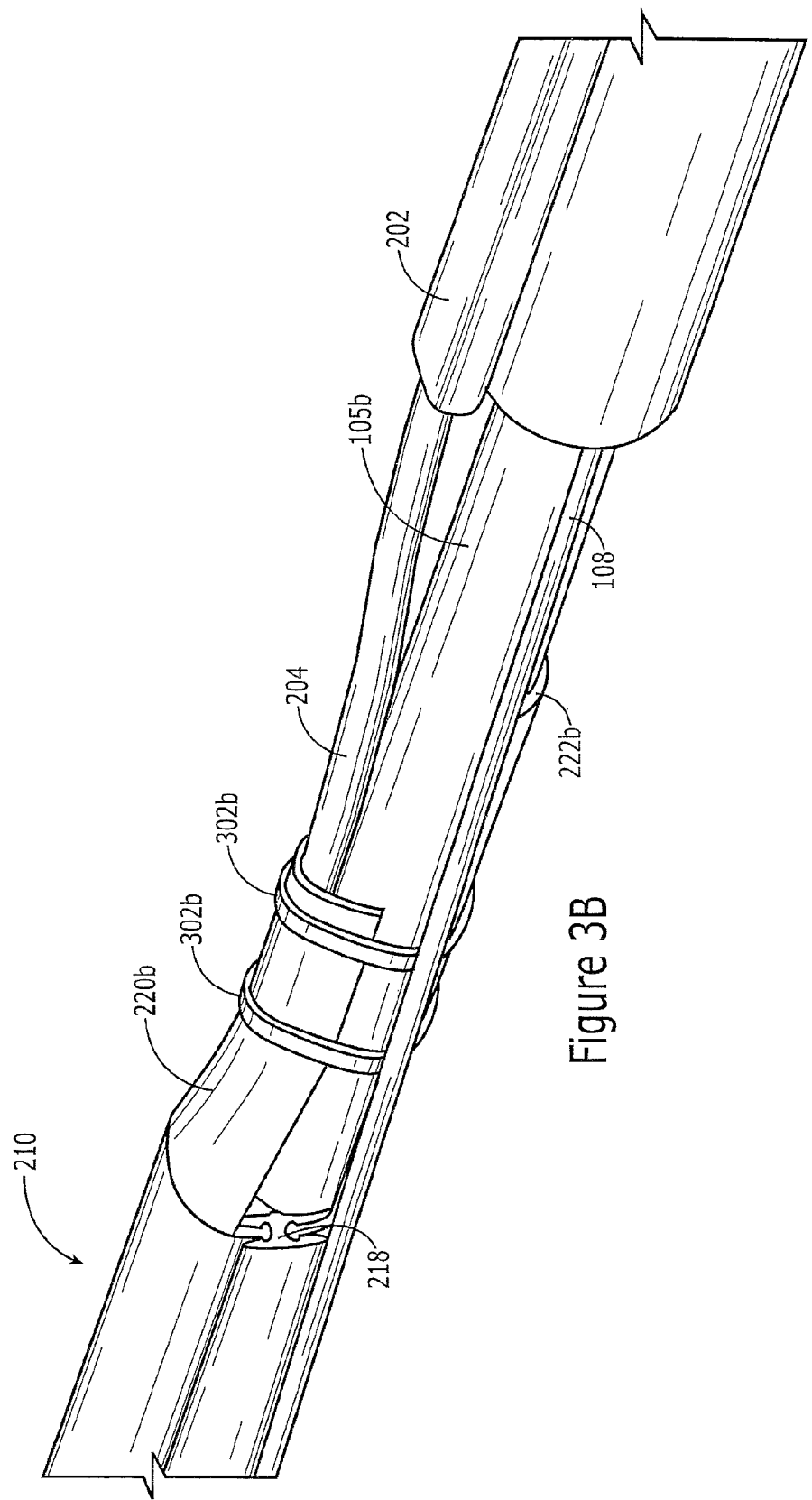
FIG. 3B is a perspective view of a portion of the inner housing shown in FIG. 3A.

As further seen in FIGS. 2, 3A and 3B, in some embodiments of the present invention, tie-down extension members 220a, 220b, 222a, 222b may extend from one or both of the outer walls 214, 216 on longitudinally displaced ends of the inner housing 210. The extension members 220a, 220b, 222a, 222b are shown extending over exposed segments 105a, 105b of the central core tube on respective ends of the section 102 of the cable 100. More particularly, first extension members 220a, 220b extend from the first outer wall 214 and second extension members 222a, 222b extend from the second wrap-around outer wall 216. Note that, as seen in the embodiments of FIG. 2, the inner wall 212 extends longitudinally over only a portion of the length 106 where the central core tube 105a, 105b is removed.

Referring now to FIGS. 3A and 3B, the inner housing 210 is shown secured around the exposed optical fibers 110 and the spliced-together portion 208. More particularly, the inner housing 210 is secured at longitudinally displaced ends thereof to the respective un-removed exposed portions 105a, 105b of the central core tube extending from the optical fiber cable 110 on respective ends adjacent to the section 106 having the outer cable sheath 104a, 104b removed. In particular, the extension members 220a, 220b, 222a, 222b extending from the outer walls 214, 216 are coupled to the respective exposed segments 105a, 105b of the central core tube by tie wraps 302a, 302b. As best seen in FIG. 3B, the tie wraps 302b on one end serve as an attachment member coupling the buffer tube 204 of the drop cable 202 to the central core tube 105b of the main cable 100 so as to couple the drop cable 202 to the main cable 100. As seen in FIG. 3A, the strength members 108 are positioned proximate substantially opposing sides of the inner housing 210 so that the fiber optic cable system is more resistant to bending about a first transverse axis $T_1$ (FIG. 4A) extending between the pair of strength members 108 than along a second transverse axis $T_2$ orthogonal to the first transverse axis $T_1$.

Referring now to the embodiments illustrated in FIGS. 4A and 4B, a flexible longitudinally extending inner liner 402 is positioned around the inner housing 210. The inner liner 402 is positioned between the inner housing 210 and the strength members 108. In some embodiments of the present invention, the inner liner 402 has a crush resistance in a radial direction relative to the central axis A1 of the main cable 100 greater than a crush resistance of the inner housing 210. As illustrated in FIGS. 4A and 4B, the inner liner 402 is a longitudinally slit polymeric flex conduit. A longitudinal slit, not shown in the figures, may be used to allow passing of the flex conduit over the main cable 100. As also shown in FIG. 4A, some embodiments of the present invention include a cut-out 404a, 404b on each end of the inner liner 402 that receives and positions a strength member 108 extending therebetween. While not visible in FIG. 4A, it will be understood that a corresponding second pair of cut-outs are provided in an opposite side of the inner liner 402, positioned substantially 180° from the visible first cut-out 404a, 404b to receive and position a second of the pair of strength members 108 extending therebetween.

As seen in FIG. 4B, as the length 106 of the central core tube 105a, 105b has been fully removed, the spliced-together fiber portions 408a, 408b may be positioned close to the central axis $A_1$. More particularly, as shown in FIG. 4B, the portions 408a, 408b are positioned in the inner housing 210 at a position radially displaced from the central axis $A_1$ by a distance 406 of no more than about half and outer diameter d of the outer sheath 104a, 104b. Thus, the splices 408a, 408b may be kept close to the neutral central axis A1 to allow bending of the finished fiber optic cable system at the splice termination points without significant stress to the sliced fibers, as the stress load on the splice would be expected to increase the greater the distance the splice point was located from the central axis $A_1$ of the main cable 100 about which flexing would occur during spooling and/or installation of the preterminated fiber optic cable system.

Furthermore, in embodiments using the flexible inner liner 402, the liner 402 may resist crushing forces yet still allow the finished product to be flexible during winding on a spool or field installation. Both the inner housing 210 and the inner liner 402 in some embodiments separate the cable strength members 108 from the splicing area, such that the spliced area may be further protected from disturbance when flexing occurs during spooling and/or field installation of the preterminated fiber optic cable system. As also seen in the embodiments of FIGS. 4A and 4B, the alignment of the strength members 108 outside the inner liner 402 may be provided on substantially opposing sides of the inner liner 402 so that the fiber optic cable system is more resistant to bending about the first transverse axis $T_1$ extending between the pair of strength members 108 than along the second transverse axis $T_2$ orthogonal to the first transverse axis $T_1$ as described previously with reference to orientation relative to the inner housing 210.

Figure 5:
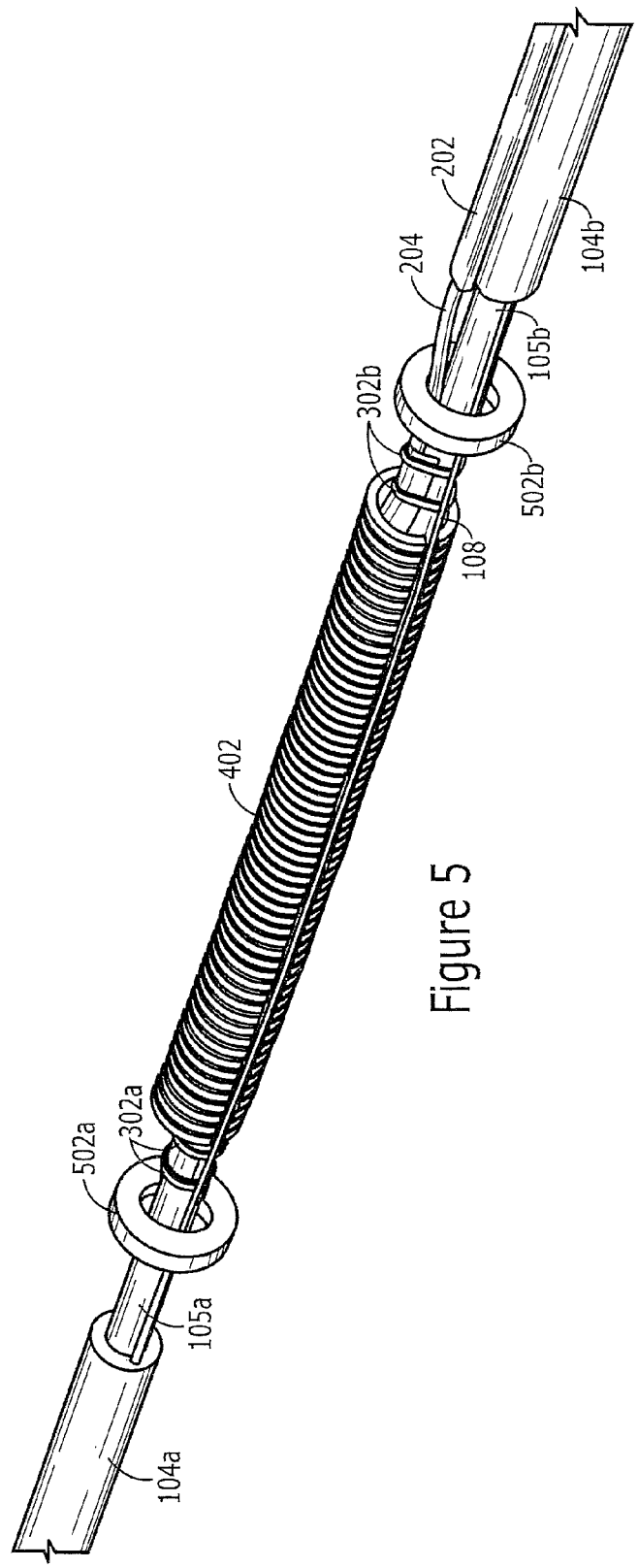
FIG. 5 is perspective view of the arrangement of FIG. 4A with environmental sealant on ends thereof according to some embodiments of the present invention.

Referring now to FIG. 5, the arrangement described previously with reference to FIG. 4A is illustrated with the further addition of an environmental sealant, shown as hot melt adhesive 502a, 502b, surrounding each of the exposed segments 105a, 105b of the core tube. After melting of the outer protective housing as will be described with reference to FIG. 6, the hot melt adhesive 502a, 502b may also be melted so as to provide sealing around and between the respective tubes 105a, 105b, 204 and the strength members 108. Such environmental sealant may, for example, limit or prevent moisture passing between the outer cable sheath 104a, 104b of the main cable 100 and the central core tube 105a, 105b and/or moisture flowing between the buffer tube 204 and the outer protective sheath of the drop cable 202 into the spliced area in the inner housing 210. A moisture flow path may otherwise be created due to damage to the outer sheath of either the main cable 100 or the drop cable 202, allowing moisture to pass into and run along the respective cables.

Figure 6:
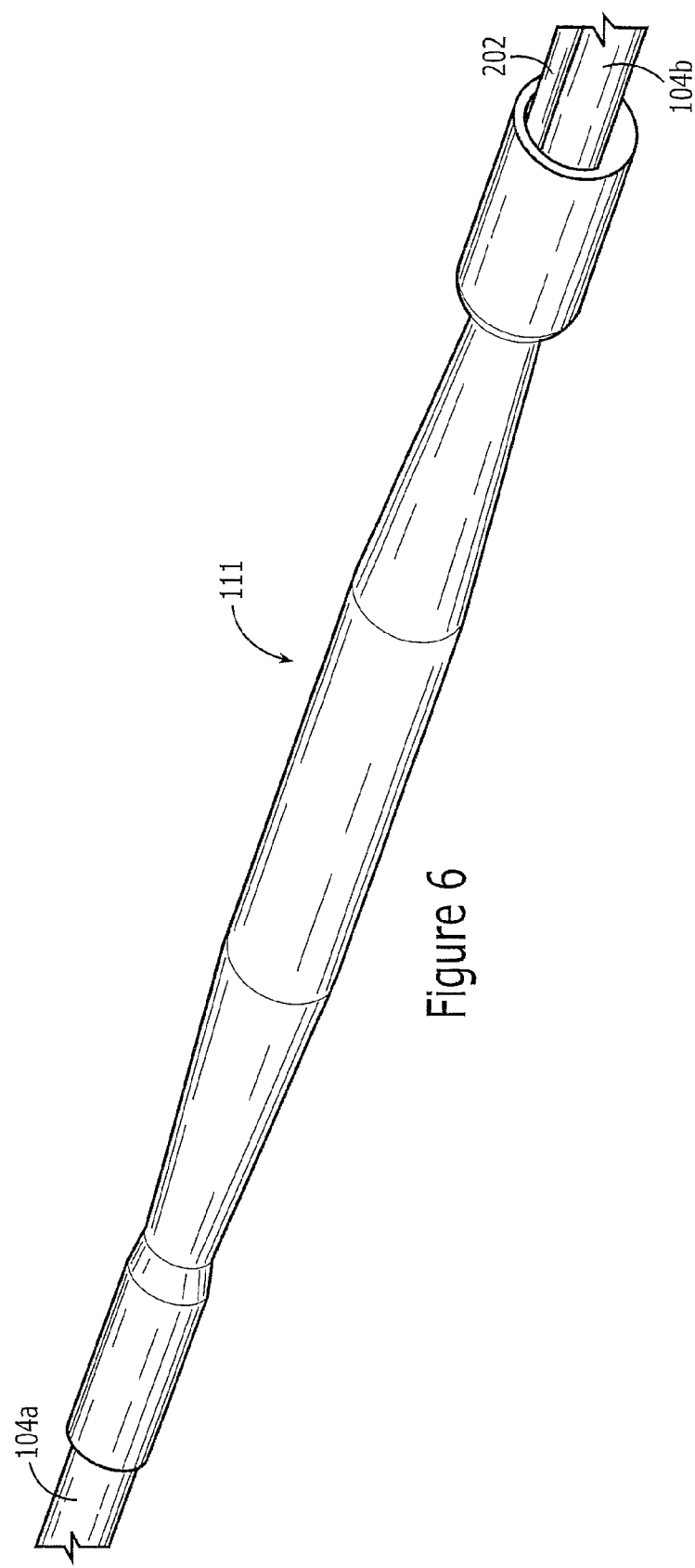
FIG. 6 is a perspective view of a fiber optic cable system according to some embodiments of the present invention.

FIG. 6 shows a longitudinally extending outer protective housing 111 extending over the section 106 of the main cable 100 having the outer cable sheath 104a, 104b removed and over the inner housing 210 and inner liner 402 and strength members 108. The protective housing 111 is shown having sufficient length to extend over and engage end portions of the outer cable sheath 104a, 104b at respective ends of the section 106 and to engage the drop cable 202. As such, the outer protective housing 111 has a first opening receiving the main cable and engaging the un-removed portion of the outer cable sheath 104a and a second opening, longitudinally displaced from the first opening, receiving and engaging the drop cable 202 and the outer protective sheath 104b of the main cable 100.

It will be understood that, as generally described with reference to FIG. 1 and the plurality of tubular outer protective housings 111, the plurality of protective housings 111 may be positioned providing an outer protective layer at predetermined positions along the main cable 100 and the main cable 100 with the protective housings 111 and enclosed splices and housings thereon may be wound around a cable spool, such as the source cable spool 101. The winding of the completed fiber optic cable system with a plurality of preterminated drop cables thereon may be facilitated by orienting the second transverse axis $T_2$ (FIG. 4A) so as to facilitate wrapping of the main cable 100 around the spool 101 by having the transverse axis $T_2$ aligned extending radially from the center of the spool 101 during winding. Thus, a factory preterminated optical fiber cable having a plurality of drop cables spliced to the main cable in housings positioned at a plurality of predetermined longitudinal positions on the cable may be provided in some embodiments of the present invention.

It will further be understood that other embodiments of the present invention provide kits for use in such factory preterminating, where the kits may include an inner housing, an inner liner, and/or an outer protective housing for use at each termination point.

Figure 7:
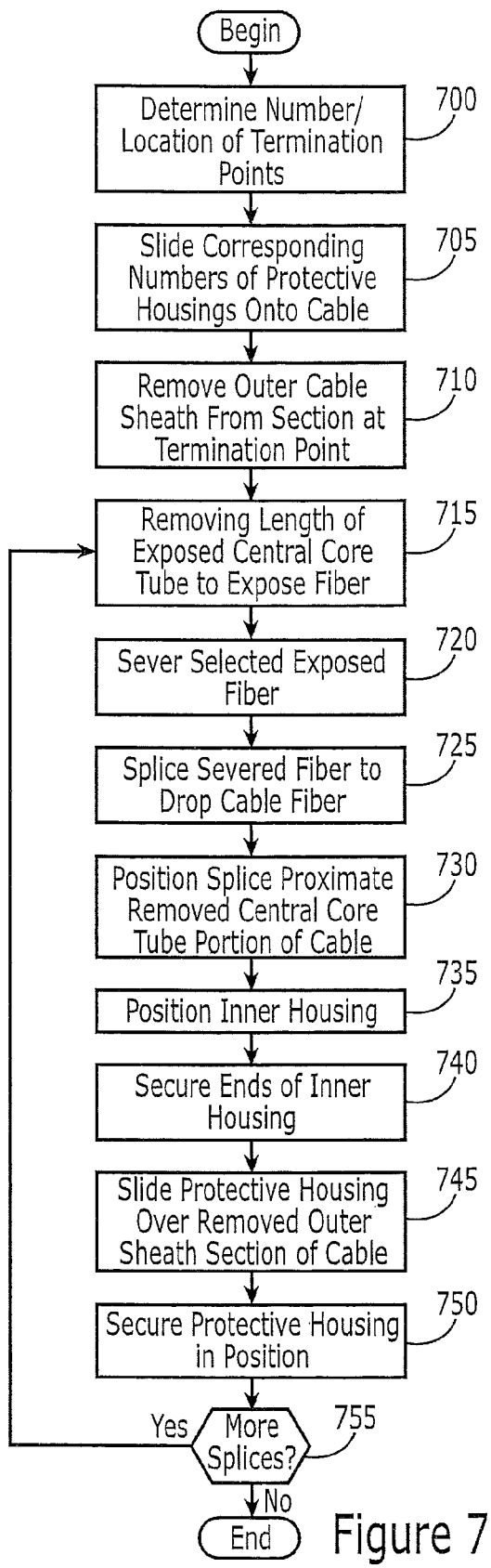
FIG. 7 is a flowchart illustrating operations for terminating an optical fiber according to some embodiments of the present invention.

Methods of factory terminating an optical fiber cable according to some embodiments of the present invention which may allow the use of tubular heatshrink, rather than wrap around sleeves will now be described with reference to the flowchart illustration of FIG. 7. As seen in FIG. 7, operations begin at Block 700 by determining a number of longitudinally offset predetermined termination points to be provided on the optical fiber cable. A number of tubular outer protective housings 111 are slid onto the optical fiber cable over a first end of the optical fiber cable, where the number of tubular outer protective housings is at least equal to the number of termination points (Block 705).

The outer cable sheath is removed from a section of the optical fiber cable corresponding to a first of the termination points to expose a strength member and a central core tube (Block 710). A length of the exposed central core tube is removed to expose a plurality of optical fibers of the optical fiber cable (Block 715). An exposed one of the plurality of optical fibers is severed (Block 720). The severed optical fiber of the optical fiber cable is spliced to an optical fiber of an optical fiber drop cable to provide a splice (Block 725). The splice is positioned in a location proximate the optical fiber cable from where the length of the exposed central core tube was removed (Block 730).

An inner housing is positioned around the exposed plurality of optical fibers of the optical fiber cable and the splice and between the plurality of optical fibers and the splice and the exposed strength member (Block 735). Longitudinally displaced ends of the positioned inner housing are secured to respective un-removed exposed portions of the central core tube extending from the optical fiber cable adjacent the section of the optical fiber cable having the outer cable sheath removed (Block 740). In some embodiments of the present invention, operations at Block 740 may further include positioning an inner liner around the inner housing and between the inner housing and the strength member. One of the tubular outer protective housings is slid over the section of the optical fiber cable having the outer cable sheath removed (Block 745). The outer protective housing is secured to the optical fiber cable to provide an environmental closure around the inner housing, with the optical fiber cable extending from respective longitudinally displaced ends of the outer protective housing and the optical fiber drop cable extending from one of the ends of the outer protective housing (Block 750). In some embodiments of the present invention, the outer protective housing is heatshrink and operations at Block 750 include heating the heatshrink.

If more splices are to be factory terminated on the optical fiber cable (Block 755), the operations at Blocks 715-750 may be repeated for each of the respective termination points. It will be understood that, during repeated operations, the optical fiber cable may be unwound from the source spool 101 (FIG. 1) to a termination station and then wound onto a second spool as a factory pre-terminated cable system ready for installation in the field.

Figure 8:
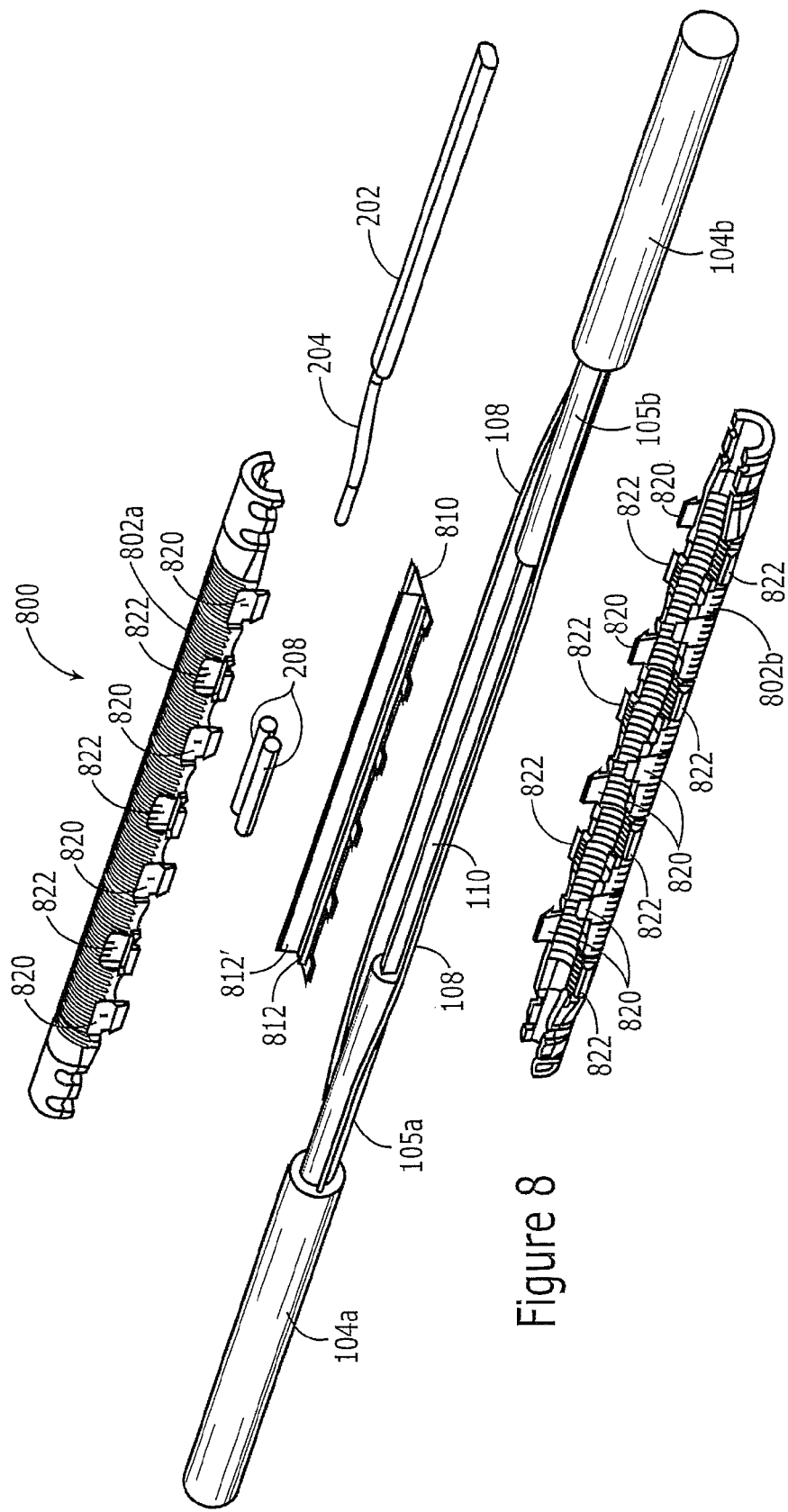
FIG. 8 is an exploded perspective view of an cable termination arrangement according to further embodiments of the present invention on the optical fiber cable of FIG. 1.
Figure 9A:
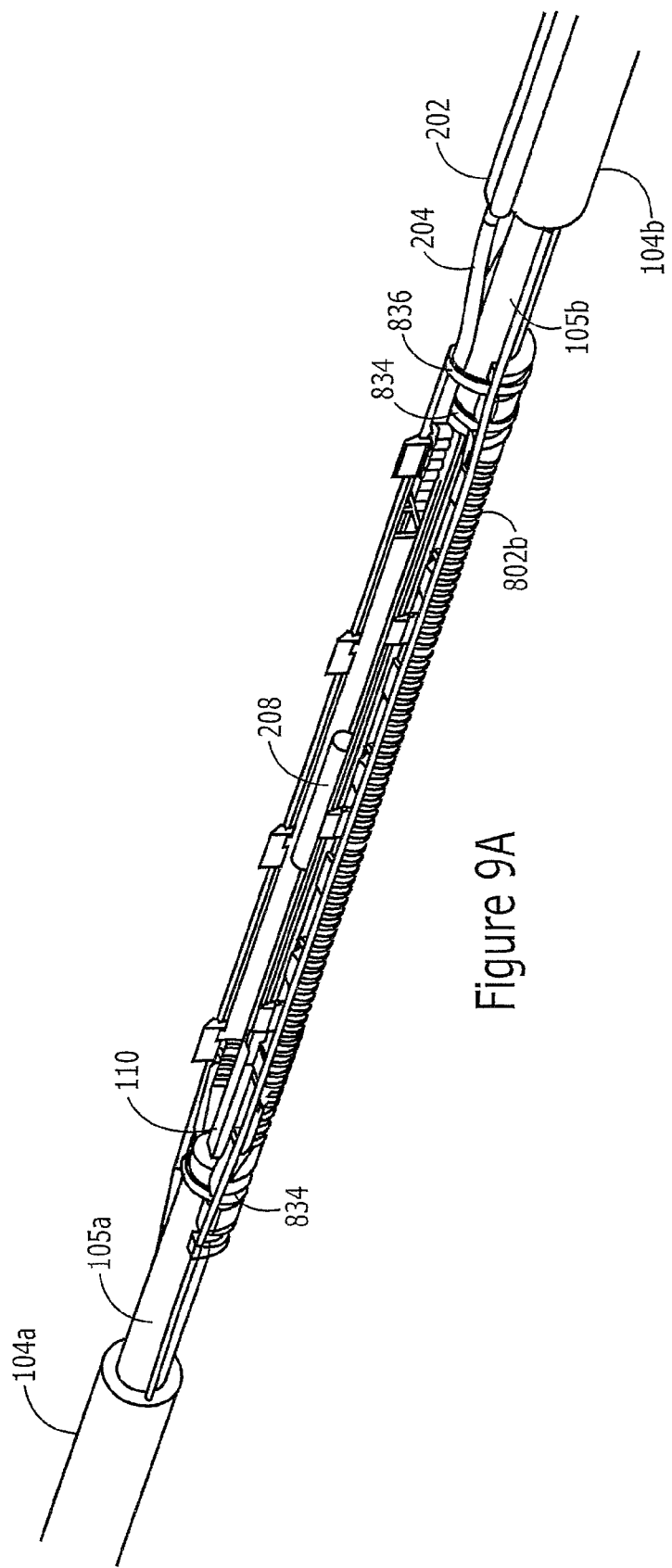
FIGS. 9A and 9B are perspective views of the cable termination arrangement of FIG. 8 with a segment of the inner liner removed and with the apparatus secured to the optical fiber cable of FIG. 1 according to further embodiments of the present invention.
Figure 9B:
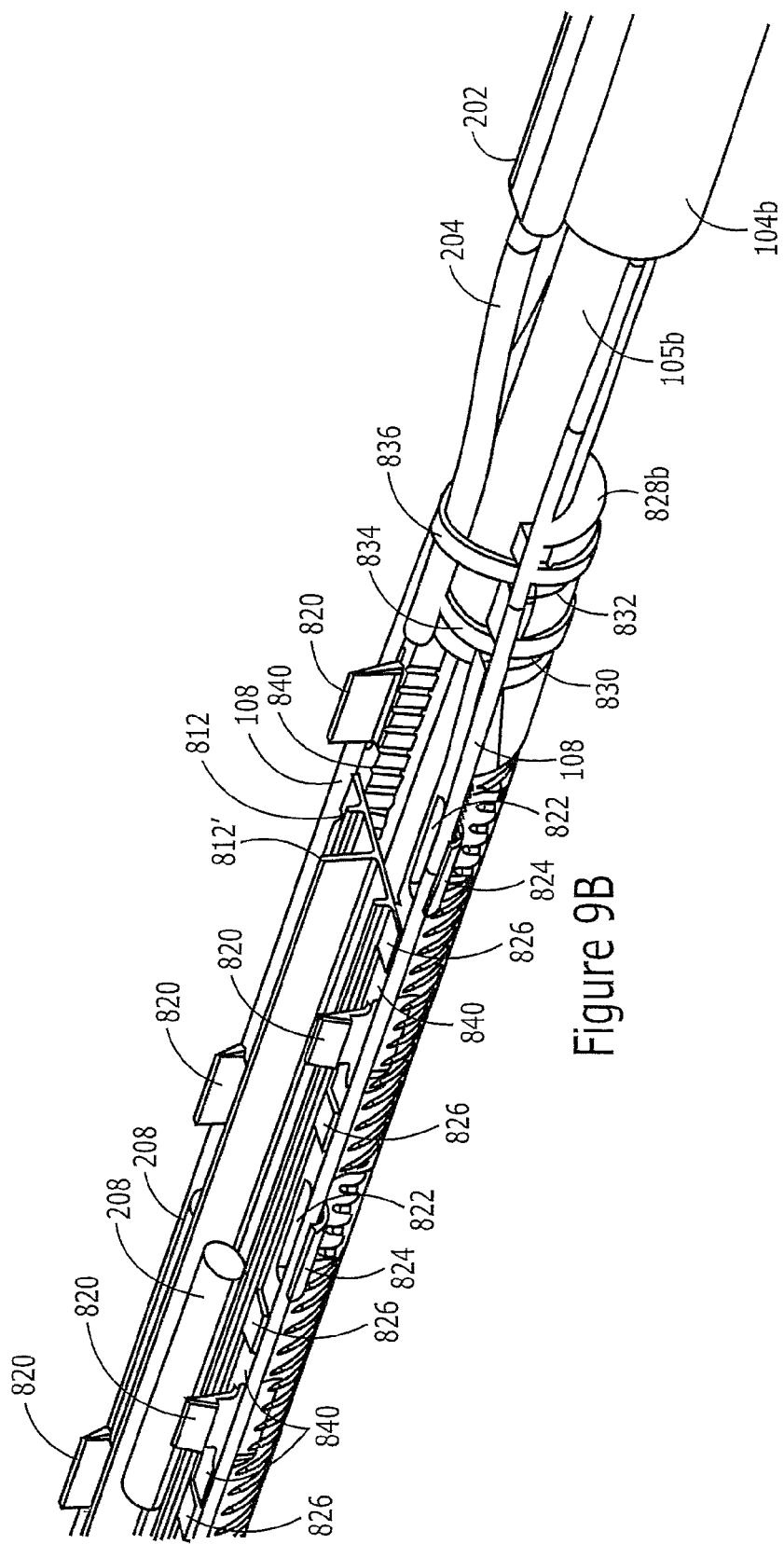
Figure 10:
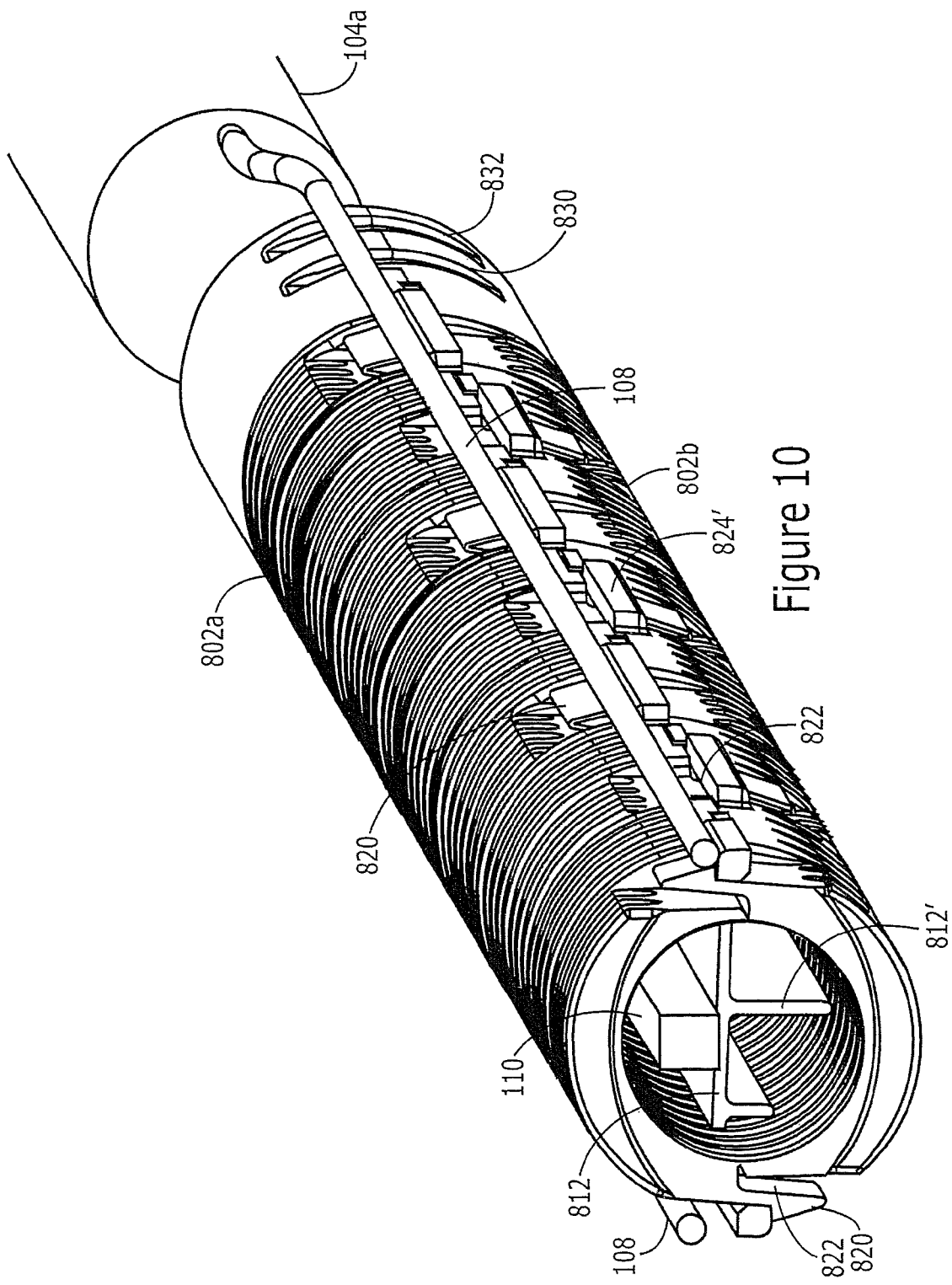
FIG. 10 is a cross sectioned perspective view of the cable termination arrangement of FIG. 8 according to further embodiments of the present invention.
Figure 11:
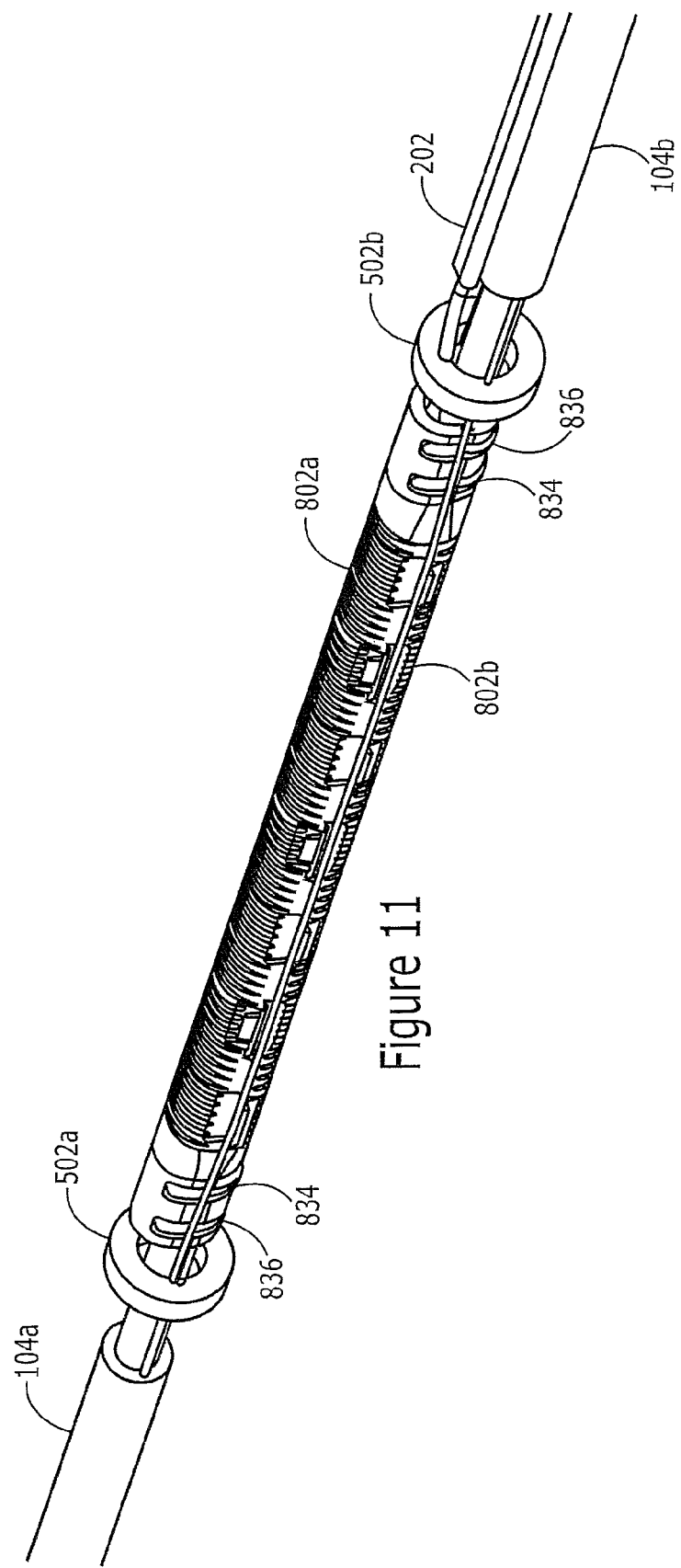
FIG. 11 is perspective view of the arrangement of FIG. 8 with environmental sealant on ends thereof according to further embodiments of the present invention.

Fiber optic cable system arrangements according to further embodiments of the present invention will now be described with references to FIGS. 8 through 11. FIG. 8 is an exploded perspective view of a cable termination arrangement that may be used in the optical fiber cable arrangement shown in FIG. 1 according to some embodiments of the present invention. FIGS. 9A and 9B are perspective views of the arrangement of FIG. 8 with a segment of the inner liner removed and with the arrangement secured to the optical fiber cable of FIG. 1. FIG. 10 is a cross-sectional perspective view of a cable terminal arrangement of FIG. 8. FIG. 11 is a perspective view of the arrangement of FIG. 8 with environmental sealant 502a, 502b on the ends thereof.

As seen in FIGS. 8 through 11, the cable termination arrangement 800 includes an inner housing 810 and a flexible inner liner having a first segment 802a and a second segment 802b. The inner housing 810 includes a longitudinally extending dividing wall 812 and a partition wall 812' extending from a middle portion thereof on one face of the dividing wall 812. As best seen FIG. 9, the inner housing 810 may be located with the dividing wall 812 positioned between uncut ones of the plurality of optical fibers 110 and one or more spliced together fiber portion(s) 208.

Each of the illustrated inner liner segments 802a, 802b shown in the embodiments of FIGS. 8 through 11 include a plurality of connecting members 820 and corresponding mating connecting members 822 at spaced locations along the mating edges of the respective segments 802a, 802b. The connecting members 820 and mating connector members 822 may be used to couple the first segment 802a and the second segment 802b in a position extending around the inner housing 810, the optical fibers 110 and a spliced together fiber portion(s) 208. As shown in the embodiments of FIGS. 8 through 11, the connecting members 820 are tabs and the mating connecting members 822 are receiving slots. The tabs and receiving slots of the respective segments 802a, 802b are positioned so as to align the respective segments 802a, 802b at a longitudinal relationship when coupled together.

As best seen in FIGS. 9A and 9B, the illustrated embodiments of the inner housing 810 is received in the second segment 802b on positioning surfaces 840 thereof configured to receive the inner housing 810. More particularly, for the illustrated embodiments in FIGS. 9A and 9B, the inner housing 810 includes positioning tabs 826 extending laterally from the dividing wall 812. The tabs 826 provide both lateral positioning for the inner housing 810 within the segment 802b and rest on the positioning surfaces 840 at a predetermined position above the centerline of the optical fibers 110 extending between the cable ends 104a, 104b. The reference surfaces 840 may in combination with the tabs 826, among other things, provide for positioning of the dividing wall 812 in close proximity to the centerline of the optical fibers 110 so that the spliced together portion(s) 208 may be positioned as closely to that centerline as possible for advantageous reasons as discussed previously with referenced to FIG. 4B.

Also shown in FIGS. 9A, 9B and 10 are guide members 824, 824'. The guide members 824, 824' extend laterally from the inner liner segment 802b and are configured to receive and position the strength member 108 extending longitudinally proximate an outer surface of the inner liner 802a, 802b. It will be understood that, where the cable 100 includes a pair of laterally displaced strength members 108, the guide members 824, 824' may be provided on both sides of the inner liner 802a, 802b and on each segment thereof, or on only one of the two segments 802a, 802b. In addition, the guide member 824 shown in FIGS. 9A and 9B differs from the guide member 824' illustrated in FIG. 10 in the inclusion of a curved portion on an end thereof configured to wrap partially around a strength member 108 received therein. In contrast, the guide members 824' shown in FIG. 10 are illustrated as substantially flat surface portions with the channels 822 extend through the surface forming the guide member 824'.

Further aspects of the illustrated embodiments in FIGS. 8 through 11 will now be described that are best seen in the illustration of FIGS. 9A and 9B. These additional aspects related to mechanical coupling of the inner liner 802a, 802b, a central core tube 805b and the buffer tube 204.

As seen in FIGS. 9A and 9B and FIG. 11, in some embodiments of the present invention, longitudinally displaced ends 828a, 828b of the inner liner segments 802a, 802b extend over the buffer tubes 105a, 105b. The end portions over the buffer tube 105a, 105b are coupled thereto by tie wraps 834, 836 positioned in respective slots 830, 832 in the end portions 828a, 828b. More particularly, as seen in FIGS. 9A and 9B, the tie wraps 834 connects the inner liner 802b to the buffer tube 105a, 105b while the tie wraps 836 further couples the buffer tube 204 to the exposed portion 105b of the central core tube extending from the optical fiber cable end 104b.

The perspective view of FIG. 11 generally corresponds to the arrangement shown in FIG. 5, but with different embodiments of the inner liner 802a, 802b and the inner housing 810 as discussed with reference to FIGS. 8 through 10. It will be understood that various aspects and advantages previously described with reference to the embodiments of FIG. 5 likewise apply to the embodiments of FIGS. 8 through 11.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method of factory terminating an optical fiber cable, comprising:

determining a number of longitudinally offset predetermined termination points to be provided on the optical fiber cable, wherein the number is greater than one;

sliding a number of tubular outer protective housings onto the optical fiber cable over a first end of the optical fiber cable, wherein the number of tubular outer protective housings is at least equal to the number of termination points;

removing the outer cable sheath from a section of the optical fiber cable corresponding to a first of the termination points to expose a portion of a fiber protection tube of the optical fiber cable;

removing a length of the exposed fiber protection tube to expose a plurality of optical fibers of the optical fiber cable;

severing an exposed one of the plurality of optical fibers;

splicing the severed optical fiber of the optical fiber cable to an optical fiber of another optical fiber cable to provide a splice;

sliding one of the tubular outer protective housings over the section of the optical fiber cable having the outer cable sheath removed; and securing the outer protective housing to the optical fiber cable to provide an environmental closure around the section of the optical fiber cable with the optical fiber cable extending from respective longitudinally displaced ends of the outer protective housing and the another optical fiber cable extending from at least one of the ends of the outer protective housing.

2. The method of claim 1, wherein splicing the severed optical fiber is followed by:

positioning the splice in a location proximate the removed length of the exposed fiber protection tube;

positioning an inner housing proximate and covering the exposed plurality of optical fibers of the optical fiber cable and the splice;

securing longitudinally displaced ends of the positioned inner housing to respective un-removed exposed portions of the fiber protection tube extending from the optical fiber cable adjacent the section of the optical fiber cable having the outer cable sheath removed; and repeating removing the outer cable sheath, removing a length of the exposed central core tube, severing an exposed one of the plurality of optical fibers, splicing the severed optical fiber, splicing the severed optical fiber, positioning the splice, positioning the inner housing, securing longitudinally displaced ends, sliding one of the tubular outer protective housings and securing the outer protective housing at additional ones of the predetermined termination points with an inner housing therein to splice additional optical fiber cables to the optical fiber cable.

3. The method of claim 2, wherein positioning the inner housing comprises positioning the inner housing around the exposed plurality of optical fibers of the optical fiber cable and the splice and between the plurality of optical fibers and the splice and an exposed strength member of the optical fiber cable.

4. The method of claim 1, wherein sliding one of the tubular outer protective housings is preceded by:
  positioning an inner housing covering the exposed plurality of optical fibers of the optical fiber cable and the splice; and
  positioning an inner liner around the inner housing and between the inner housing and an exposed strength member of the optical fiber cable.

5. The method of claim 1, wherein the outer protective housing comprises heatshrink and wherein securing the outer protective housing comprises heating the heatshrink.

* * * * *